United States Patent Office 3,303,571
Patented Feb. 14, 1967

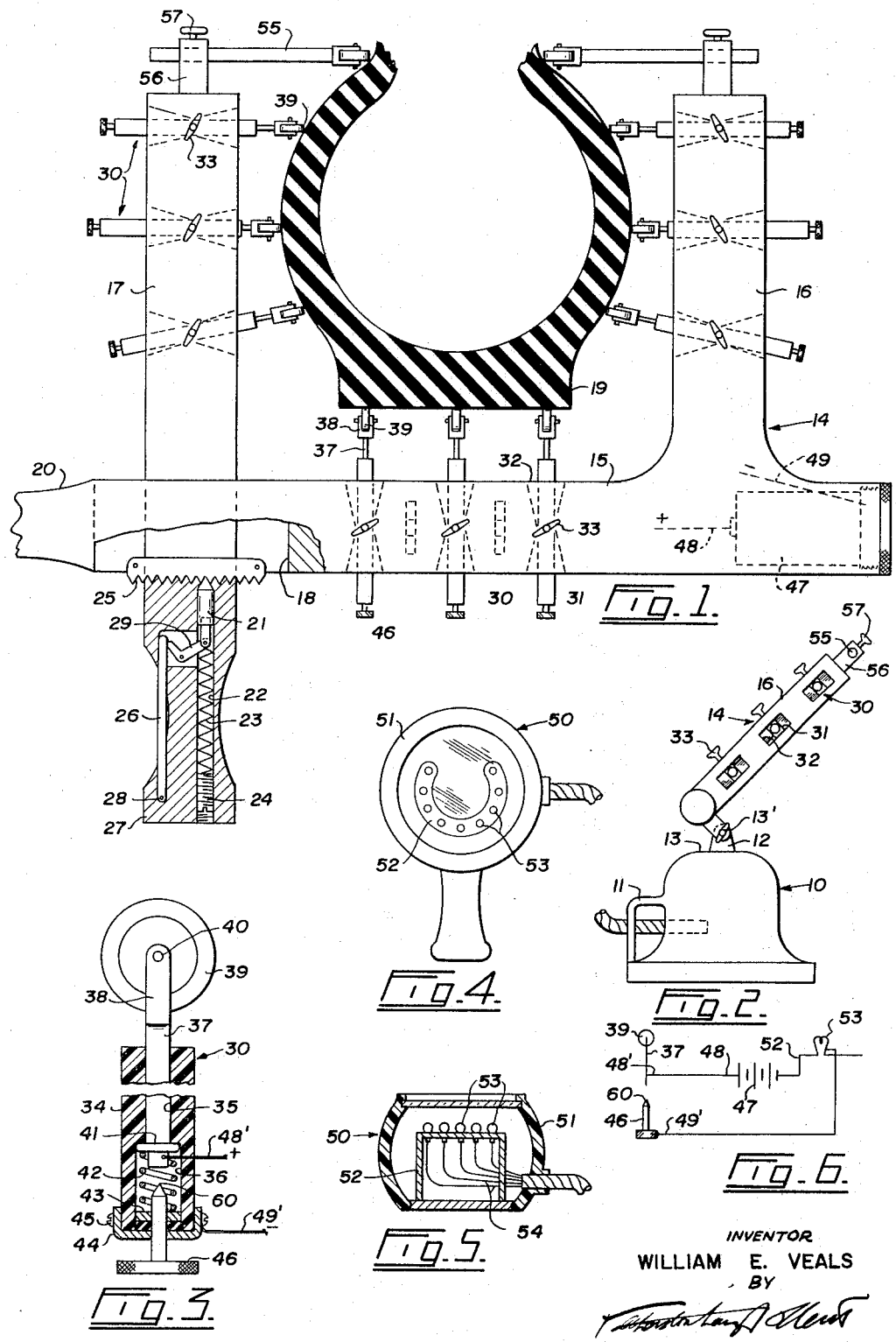

3,303,571
APPARATUS FOR TESTING WHEEL MOUNTED INFLATED TIRES
William E. Veals, Darlingford, Manitoba, Canada
Filed June 22, 1964, Ser. No. 376,967
5 Claims. (Cl. 33—174)

My invention relates to new and useful improvements in devices for testing tires, particularly inflated tires mounted upon the axles of automobiles and the like.

The main fault occurring in present day automotive tires and the like is ply separation which, with continued use, leads to blowouts particularly when said tire becomes overheated due to high speed highway driving.

Unfortunately ply separation is not normally visible until it is in an advanced stage and heretofore no device or method has been devised to locate such ply separations in the early stages.

I have overcome these disadvantages by providing a method and apparatus for locating ply separations at any stage thus enabling the tires on automobiles to be tested rapidly and easily for such ply separations.

When the plies forming a tire begin to separate, the outer surface of the tire is weakened slightly therefore, when the tire is inflated, a slight bulge or bump occurs, the size of which depends upon the stage of ply separation.

As an example, when two plies of a tire begin to separate, such enlargement is invisible but when the ply has separated by a considerable amount, the enlargement may readily be seen if the tires are examined carefully.

However, such separations often occur upon the wall of the tire which is innermost and these particular walls are extremely difficult to inspect visually so that in many instances, the first indication a motorist has of ply separation, is when a blowout occurs with the subsequent danger of the vehicle going out of control.

I have overcome these disadvantages by providing a method and device which enables the tire to be rotated slowly between a plurality of probes in contact with the outer surface of the tire, said probes being adapted to make electrical contact with an indicator if there is any enlargement of the dimension of the tire at the line of contact of the individual probes.

The principal object and essence of my invention is therefore to provide a device of the character herewithin described which enables tires to be tested in situ readily and easily.

Another object of the invention is to provide a device of the character herewithin described in which the four tires of a car can be tested within a few minutes thus assuring the operator that no ply separations exist.

A further object of the invention is to provide a device of the character herewithin described which is adjustable for use with the majority of conventional sizes of tires.

Yet another object of the invention is to provide a device of the character herewithin described which includes a plurality of probes contacting the tire around the cross sectional configuration thereof, each probe being connected to its own indicator so that as soon as an indicator shows an enlarged dimension, the slow rotation of the tire can be stopped and the enlargement located immediately.

A still further object of the invention is to provide a device of the character herewithin described which is particularly suitable for inclusion in automobile and truck testing stations operated privately, municipally, or by any other agency.

Still another object of the invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a front elevation of the yoke portion of my device sectioned in part to show the interior thereof and shown in relation to a tire being tested.

FIGURE 2 is a view of the device mounted upon the base in reduced scale to FIGURE 1.

FIGURE 3 is a cross section enlarged view of one of the probes per se.

FIGURE 4 is a top plan view of the indicator on a similar scale to FIGURE 2.

FIGURE 5 is a vertical section of FIGURE 4.

FIGURE 6 is a schematic wiring diagram of one of the probes.

In the drawings like characters of reference indicate corresponding parts in the different figures.

Proceeding therefore to describe my invention in detail, reference should be made to the accompanying drawings in which 10 indicates a substantially heavy base made preferably of cast iron and being hollow, the interior of the base acting as a junction box for the various electrical connections.

Handle 11 facilitates the manipulation of the device and a lug 12 extends upwardly from the upper surface 13 thereof.

Secured to the lug by means of bolt 13′ is the yoke assembly collectively designated 14, said yoke comprising a horizontal component 15 and a pair of spaced and parallel side arms 16 and 17. The side arm 16 is formed preferably with the horizontal portion 15 but the side arm 17 is mounted through a slot 18 within the horizontal portion for limited movement towards and away from the side arm 16 so that the engagement and disengagement of the device upon the tire 19 is facilitated.

Portion 20 of the horizontal component 15 extends beyond the side arm 17 and forms a handle to facilitate the positioning of the device around the tire 19.

The side arm 17, mounted within slot 18, includes a ratchet pawl 21 mounted within a drilling 22 and normally maintained in the ratchet engaging position by means of spring 23 held within the drilling 22 by means of screw 24.

A ratchet plate 25 is secured to one side of the slot 18 and the pawl 21 normally engages this ratchet plate thus locking the side arm 17 in the desired relationship to the side arm 16.

A release trigger 26 is pivoted within the lower end 27 of the side arm by means of pin 28 and is adapted to operate the small bell crank 29 mounted within the base portion 27, the other end of the bell crank being connected to the pawl 21 so that when the lever 26 is moved inwardly, the pawl 21 is disengaged from the ratchet plate thus permitting the side arm to be moved in one direction or the other.

A plurality of probes collectively designated 30 are detachably connected to the side arms and to the horizontal portion 15. Slot 31 are formed through the side arms and through the horizontal portion, the outer ends 32 of the slots widening as illustrated in phantom in FIG. 1, thus permitting the probes to be moved inwardly or outwardly with relation to the side arms and the horizontal portion or inclined from one side to the other thus giving excellent adjustment to the probes so that different sizes of tires can be tested.

When the probes are positioned correctly, thumb screws 33, engaging the side arms and the horizontal portion, clamp the probes into the desired positions.

The probes are shown in detail in FIGURE 3 and consist of an insulated holder or body portion 34 having a square cross section aperture 35 formed longitudinally therethrough, said aperture enlarging one end thereof as at 36.

A square cross sectioned stem 37 is slidable within the aperture 35, said stem terminating in a bifurcated fork 38 between which is mounted a small roller or wheel 39 upon pin 40.

A washer 41 is secured to the stem and a spring 42 reacts between the washer 41 and a metal washer 43 secured within the enlarged portion 36 of the body.

A cap 44 is secured by screws 45 to the end of the body and said cap is apertured to receive the screw threaded adjusting screw or contact 46 which is screw threaded into washer 43. A rubber insulating washer is situated between the cap 44 and the metal washer 43.

A source of electrical energy such as battery 47 is contained within one end of the horizontal portion 15 of the yoke and the positive connection 48 extends to the positive connection 48' of each probe, namely the stem 37 which is preferably made of copper or similar electrically conducting material.

The negative side 49 of the battery extends to the indicator collectively designated 50 as will hereinafter be described, and then to the electrically conducting cap 45 as at 49' so that the screw 46 in conjunction with the stem 37 acts as a switch to make or break the electrical circuit.

The indicator 50 comprises an enclosure 51 within which is situated a multiple lamp holder 52 carrying an indicator lamp 53 for each probe 30 and these are preferably arranged so that the position of the indicator lamp corresponds to the position of the relevant probe.

Individual electrical connections 54 extend from each indicator lamp to each probe cap 44 so that if any probe stem 37 contacts the screw 46, the relevant indicator lamp is illuminated.

In operation, the tire to be tested is to be jacked clear of the supporting surface so that it is free to rotate upon the axle thereof.

The side arm 17 is opened to its widest extent and the device is maneuvered so that the yoke embraces the tire substantially in the positiond shown in FIGURE 1.

The probes are adjusted so that the rollers 39 are in contact with the contour of the tire and in this connection note should be taken of a pair of horizontally situated rods 55 mounted within supports 56 upon the upper ends of the side arms 16 and 17 and clamped into position by means of thumb screws 57. The rollers 58 upon the ends of these rods are adapted to engage the portion 59 of the tire immediately adjacent the rim thus steadying the device while the tire is being tested.

The adjusting screws 46 are rotated until the desired linear gap exists between the stem 37 and the terminal end 60 of the screws whereupon the tire is slowly rotated through the yoke.

Any increase in dimension of the contour of the tire occurring due to ply separation, will move the relevant probe outwardly thus closing the circuit and illuminating the relevant indicator lamp so that by rotating the tire through one revolution, the entire contoured surface may be checked rapidly.

The adjusting screws 46 may, if desired, be provided with indicia (not illustrated) and an indicating mark on the cover so that the probes can be set readily and easily when changing from one size of tire to another.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A device for testing wheel mounted inflated tires comprising in combination a base, a yoke secured to said base and extending upwardly therefrom, said yoke including a pair of spaced and parallel side arms and a substantially horizontal portion spanning the lower ends of said side arms, a plurality of spring loaded probes extending inwardly from said side arms and said horizontal portion, contacting the surface of the tire being tested, an indicator electrically connected to each of said probes, a source of electrical energy, said probes including means to complete the circuit between said probes, said source of electrical energy and said indicator, upon outward movement of said probes, thereby indicating an increase of dimension of said tire in contact with said probes.

2. The device according to claim 4 in which one of said side arms is mounted for limited movement upon said horizontal portion with relation to the other of said side arms.

3. The device according to claim 1 in which each of said probes is adjustable inwardly and outwardly within limits.

4. The device according to claim 1 in which each of said probes is mounted for limited pivotal adjustment with relation to said side arm and to said horizontal portion.

5. The device according to claim 1 in which each of said probes includes an insulated holder, a rod slidable lengthwise in said holder, a roller upon the tire contacting end of said rod, an adjusting contact screw in the base of said holder contactable by the other end of said rod and spring means normally biasing said rod towards the tire contacting position.

References Cited by the Examiner
UNITED STATES PATENTS 2,251,803  8/1941  Pummill _____ 73—146
3,123,791  3/1964  Koche et al. _____ 73—398 X

FOREIGN PATENTS 760,458  10/1956  Great Britain.

LOUIS R. PRINCE, *Primary Examiner.*

D. O. WOODIEL, *Assistant Examiner.*